Nov. 28, 1967  M. ESPINAL  3,355,067
RECORDING PILL DISPENSER
Filed April 27, 1967  4 Sheets-Sheet 1
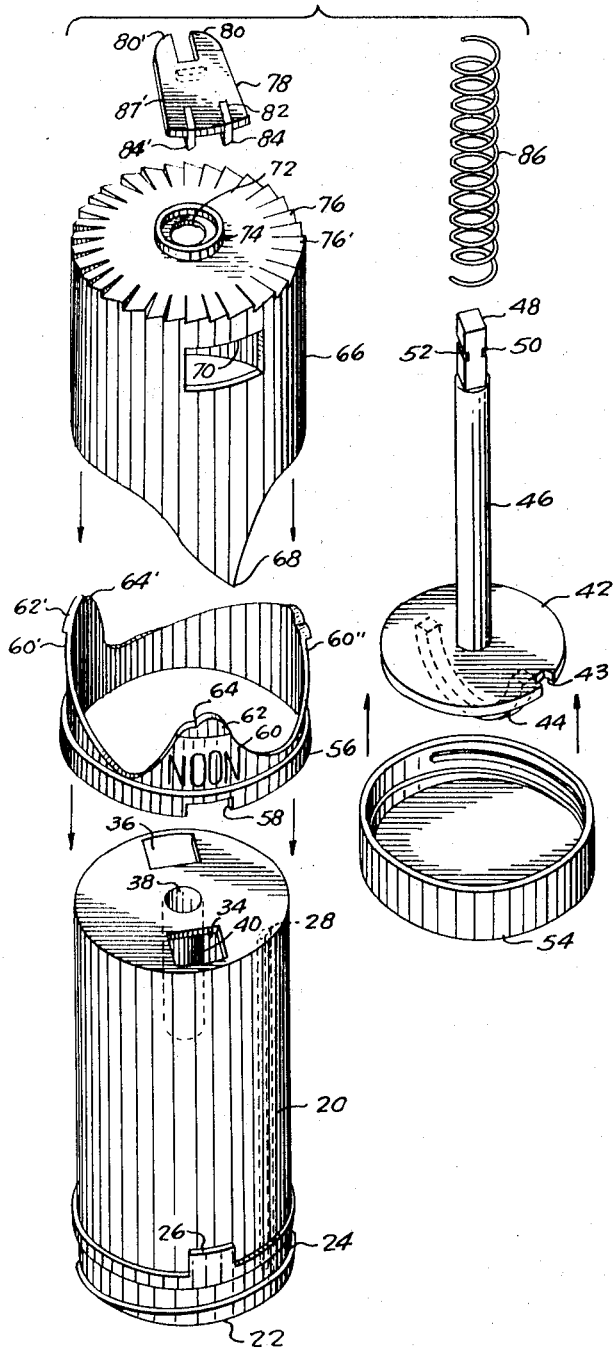
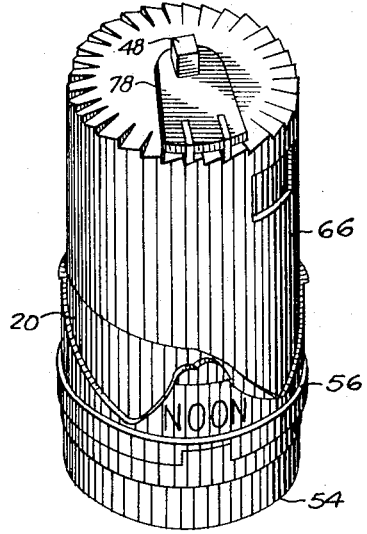
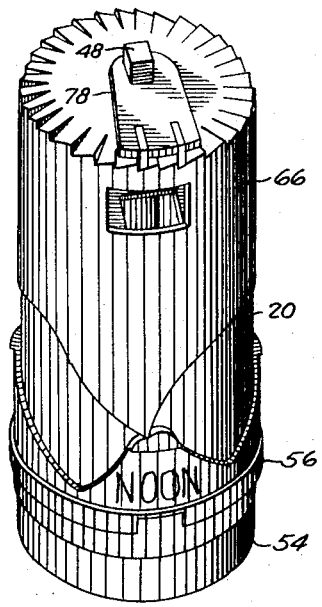
INVENTOR.
MARTIN ESPINAL,
BY
Kimmel, Crowell & Weaver
ATTORNEYS.

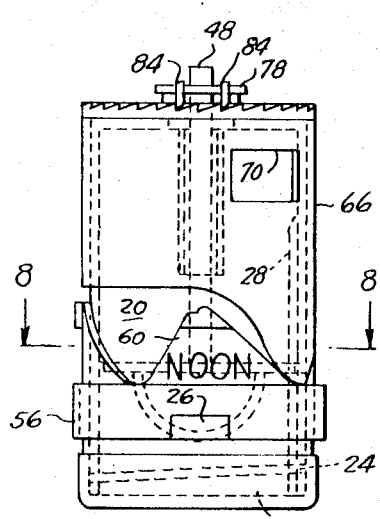
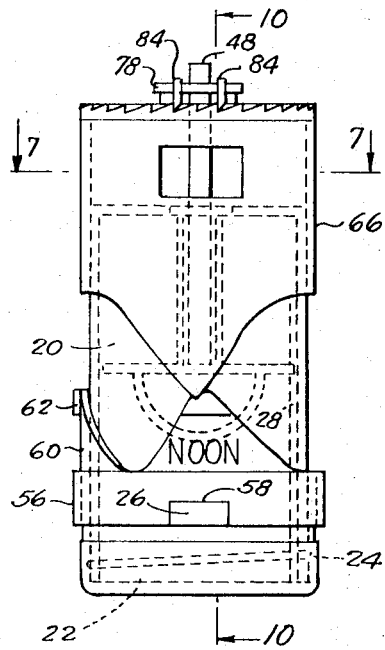
FIG. 4.   FIG. 5.
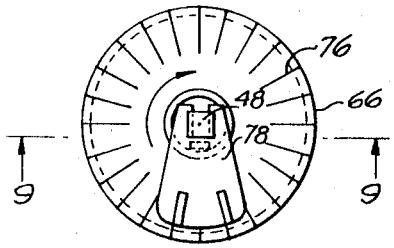
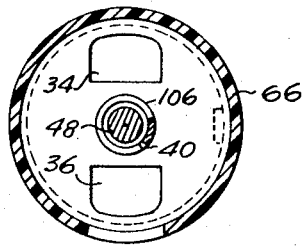
FIG. 6.   FIG. 7.
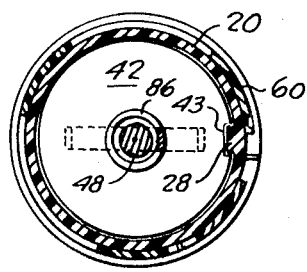
FIG. 8.

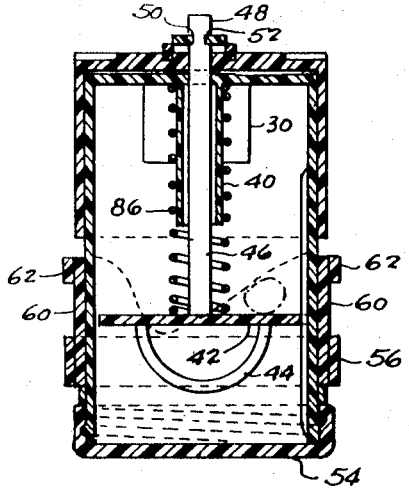
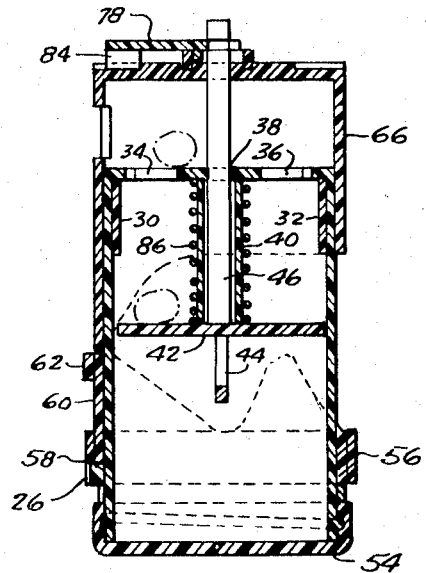
FIG. 9.        FIG. 10.
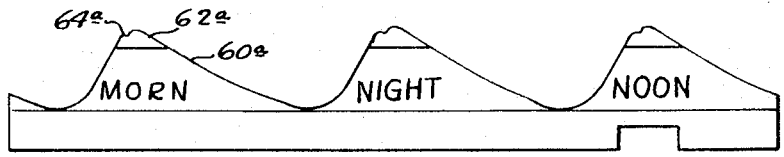
FIG. 11.
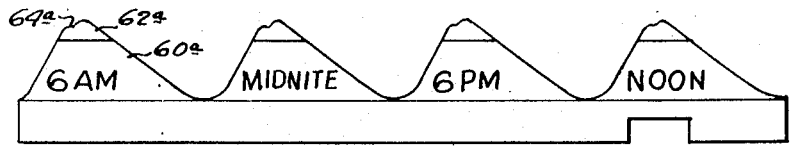
FIG. 12.
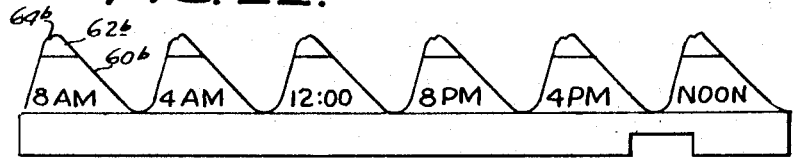
FIG. 13.
INVENTOR
MARTIN ESPINAL,
BY
ATTORNEYS.

Nov. 28, 1967  M. ESPINAL  3,355,067
RECORDING PILL DISPENSER
Filed April 27, 1967  4 Sheets-Sheet 4

INVENTOR.
MARTIN ESPINAL
BY
Kimmel, Crowell & Weaver
ATTORNEYS.

United States Patent Office 3,355,067
Patented Nov. 28, 1967

3,355,067
RECORDING PILL DISPENSER
Martin Espinal, 5529 Marconi Ave.,
Carmichael, Calif. 95608
Filed Apr. 27, 1967, Ser. No. 634,231
14 Claims. (Cl. 222—23)

ABSTRACT OF THE DISCLOSURE

A cylindrical pill dispenser container having a bottom opening and a top dispensing opening covered by a rotatable closure which is lifted to permit dispensing of a pill upon rotation wherein the position of the rotatable closure is indicative of the last previous time or event when the dispenser was opened is disclosed. A pill dispenser of the type described including a resilient ring and boss arrangement and a spring biased slide catch and boss arrangement for preventing access to the pills by small children are also disclosed.

Cross-reference to related application

This is a continuation-in-part of application Serial No. 606,694, filed January 3, 1967, now abandoned.

Background of the invention

*Field of the invention.*—This invention relates generally to dispensing containers and more particularly to recording dispensing containers in which a successive indication is given each time the container is opened for dispensing a pill or similar article.

*Description of the prior art.*—Devices are known in the prior art which permit opening of pill dispensers only upon the happening of a predetermined event and devices which record the opening of the pill dispenser. Such devices are described in U.S. Patents No. 3,151,599, issued to Livingston on October 6, 1964; No. 3,206,064, issued to Cantu et al. on September 14, 1965; No. 3,261,-455, issued to Gayle et al. on July 19, 1966; and No. 3,278,010, issued to Katz on October 11, 1966. The present invention is an improvement in dispensers of this type and specific objects of the invention include the specific structural combination and the provision of a recording pill dispenser which is adaptable for use with pills of varying sizes or with mixtures of two or more pills of different sizes.

Summary

This invention relates to a pill dispenser which has a cylindrical container having a bottom opening for permitting pills to be introduced therein and having top apertures therein for dispensing the pills. The top is covered by a rotatably received closure which has a side window opening and which is raised upon rotation by engagement with a prime marker or recording sleeve. The rotatable closure cover is biased downwardly toward the top of the container and is ratcheted to permit rotation in only one direction. Replaceable recording or time indicating sleeves are provided and the pill box is easily disassemblable for replacement of the sleeves for easy adaption to the needs of the individual. In one embodiment a ring is provided around a resilient cylindrical container and a boss is provided on an enclosing cylindrical member and disposed such that access cannot be had to the top of the dispenser without resiliently pressing the ring for release of the boss. A similar child-proof dispenser is also provided in an alternative embodiment which includes a spring biased slide catch in the bottom of the dispenser and a resiliently biased release button for permitting the pill dispenser to be opened only by simultaneous pressing of the button and operation of the rotatable closure cover.

Accordingly, the following are purposes and objects of the invention:

The provision of a recording pill dispenser having a cylindrical container surrounded by a rotatable closure cover which may selectively be raised to permit dispensing of a pill;

The provision of a resilient cylindrical pill container having a ring boss surrounding it for engagement by another boss to prevent dispensing of a pill by a small child;

The provision of spring biased slide catch disposed in the bottom of the container for preventing access to the pills by a child; and The specific combinations, constructions, elements, and features of the embodiments as disclosed hereinafter.

Brief description of the drawing

FIGURE 1 is a perspective view of the pill dispenser shown in its closed position.

FIGURE 2 is a perspective view of the dispenser shown in its open position.

FIGURE 3 is an exploded perspective view of the pill dispenser showing the components thereof and their relative positions.

FIGURE 4 is a side view of the pill dispenser in the closed position.

FIGURE 5 is a side view of the pill dispenser shown in the open position.

FIGURE 6 is a top view of the pill dispenser.

FIGURE 7 is a top cross-sectional view of the pill dispenser in the open position taken substantially along line 7—7 in FIGURE 5.

FIGURE 8 is a top perspective view of the pill dispenser in its closed position taken substantially along lines 8—8 in FIGURE 4.

FIGURE 9 is a side cross-sectional view of the pill dispenser taken substantially along lines 9—9 in the direction of the arrows as shown in FIGURE 6.

FIGURE 10 is a side cross-sectional view of the pill dispenser in its open position taken substantially along lines 10—10 in the direction of the arrows as shown in FIGURE 5.

FIGURES 11, 12 and 13 are indicative of variations in the time indicating sleeve construction which may be adapted for use with the present invention.

Description of the preferred embodiment

Figure 15:
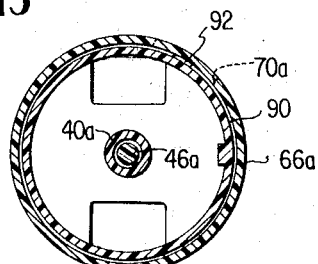
FIGURE 15 is a cross-sectional view looking upwardly taken substantially along lines 15—15 in the direction of the arrows as shown in FIGURE 14.

Referring generally to FIGURES 1 through 3, it will be seen that the present invention comprises a cylindrical container 20 which has a bottom opening 22, shown best in FIGURE 3, bottom peripheral threads 24 and an exterior boss 26 on the surface of the cylindrical container 20 just above the peripheral threads. An interior guide boss 28 is also provided as shown in FIGURE 3 and as better shown in FIGURE 4, FIGURE 8, and in FIGURE 9. A pair of interior upper stops 30 and 32 are also provided on the interior surface of the cylindrical container, as best shown in FIGURE 10. Cylindrical container 20 is provided at the top with dispensing openings 34 and 36 and with a center aperture 38 which is connected a cylindrical guide member 40 which extends downwardly into the container.

In the container, a disc 42 having a notch 43, which receives guide boss 28, is slidably received. A handle 44 may conveniently be secured to the bottom of disc 42 and a shaft 46 having a square end 48 extends upwardly therefrom. Notches 50 and 52 are provided in square end 48, the function of which will be described hereinafter. A bottom closure 54 is provided for the dispensing cylindrical container 20.

An important feature of the present invention resides in the provision of a removable recording or time marker sleeve 56 which has a notch 58 therein which is received over boss 26 to fix the sleeve against rotation. Sleeve 56 is provided with a plurality of upwardly extending projections 60 which have projection bosses 62 on the top thereof which are provided with projection notches 64. Any desired number of projections 60 may be provided. Exemplary arrangements are shown in FIGURES 11, 12 and 13.

Rotary dispensing cap 66 is rotatably received over the top end of dispensing container 20 and forms a rotatable closure therefor. A pointer projection 68 extends downwardly from cap 66. The pointer projection 68 engages sleeve 56, as best shown in FIGURES 2 and 3 and as the cap 66 is rotated clockwise from the position shown in FIGURE 1 to the position shown in FIGURE 2, the cap is raised from its normal position wherein the top planar portion closes openings 34 and 36 to the position shown in FIGURE 2 for permitting pills to be removed through openings 34 and 36. After the desired pill or number of pills has been removed, the cap is further rotated clockwise and pointer 68 moves downwardly on the left side of projection 60, as shown in the figures.

The pills are removed through side opening 70 in cap 66. Cap 66 is provided with a central aperture 72 and a guide drum at 74 surrounding the aperture. The cap is also provided on the top with a multiplicity of notches 76.

Ratchet arm 78 which is provided with fingers 80 for engagement in notches 50 and 52 on square end 48 of shaft 46 and with slots 82 in which are received dogs 84 forms a ratchet with notches 76 and a retainer for holding the cap in place on the dispensing container. Compression spring 86 is received about shaft 46 outside guide 40.

Cap 66 is biased downwardly by spring 86 toward the top of container 20. Thus, in the normal position, the planar top portion of cap 66 closes openings 34 and 36 and is maintained in the closed position by the bias exerted by compression spring 86 between disc 42 and the inner top surface of container 20 adjacent aperture 38.

If it is desired to disassemble the dispenser to replace the time marker sleeve 56, the fingers 80 on ratchet arm 78 are disengaged from notches 50 and 52 on shaft 46 and the arm 78 is removed. Cap 66 may then be lifted from the container and the sleeve 56 removed from the container wherein it is slidably received. The desired sleeve may be placed in position and the cap replaced in its rotatable position over the container and secured in place by ratchet arm 78.

Pills may be introduced into the container either through opening 70 or the container may be disassembled and the pills introduced into the container through the bottom opening 22.

It will be apparent from the ratchet arrangement that the cap 66 may be rotated in only one direction thereby preventing accidental rotation in the wrong direction which would result in an erroneous indication of the last time of taking a pill.

While not essential to the invention, in the preferred embodiment it is highly desirable that the container be constructed of a transparent plastic material such as the polyacrylic resins, the polystyrene resins, or an equivalent resinous material.

Experience has indicated that it is highly desirable to provide a recording pill dispenser which includes means for preventing access to the pills by small children. It will be understood that, except for providing extremely complex locks and storage vaults, it is practically impossible to prevent grown children and young adults from having access to pills in the home. However, it will also be realized that with respect to small children it is desirable to have a pill dispenser which is complex enough in its operation so that they will not be aware of the means for opening it, will not have the manual dexterity required to open the dispenser, or will not be able to reason out the mechanism and the operating steps necessary to open this dispenser. It is also important that such a dispenser be simple enough for quick easy opening by an adult. It is to this end that the embodiments of FIGURES 14 through 16 and FIGURES 17 through 19 are shown.

Figure 14:
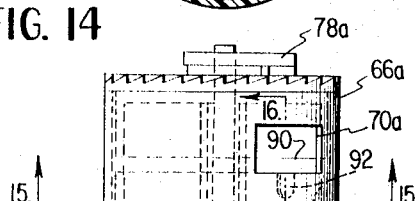
FIGURE 14 is a side view of an improved construction of the invention showing one embodiment of a mechanism for preventing access to the pills by a child.
Figure 16:
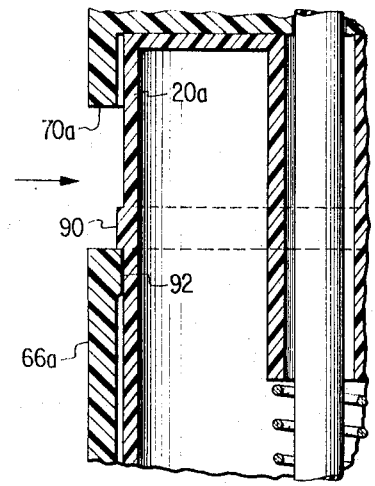
FIGURE 16 is an enlarged side cross-sectional view showing the annular boss on the cylindrical container and the engaging boss on the rotatable cover.

Referring first to FIGURES 14, 15 and 16, it will be understood that in the preferred embodiment the container 20a is made of a resilient or semi-resilient material. As will be understood, great resilience is not required but the material should be resilient enough to permit a minor degree of flexing without cracking.

The rotatable cap 66a is provided with an aperture 70a in the conventional manner. The aperture 70a will be specially placed, however, as described hereinafter. An annular boss 90, which may entirely surround the container 20 or substantially surround the container is provided on the exterior surface of the container. The annular boss 90 and the container, as previously pointed out, are of a semi-resilient material. A boss 92 is provided on the interior surface of the cap 66a and, in the closed position, normally engages the bottom of the annular boss 90, as best shown in FIGURE 16. In this position it is impossible to lift the cap to permit access to the pills without first pushing in on the walls of container 28 to disengage the boss 92 from the annular boss 90. Once this disengagement has taken place the cap may be raised and rotated in the normal manner. As shown in FIGURE 16, the boss 90 and the boss 92 are preferably integrally formed as part of the container and the cap respectively; however, these bosses may be added after the containers are formed if desired.

Figure 17:
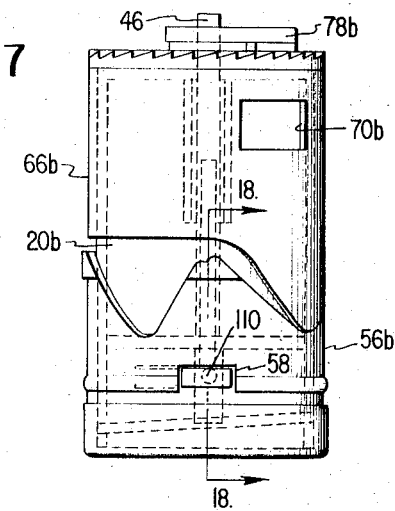
FIGURE 17 is an alternative and a preferred embodiment of the pill dispenser including a slide catch member for preventing access to the pills either from the top or the bottom by children.
Figure 18:
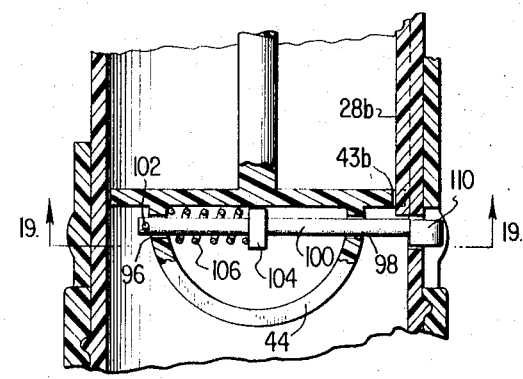
FIGURE 18 is an enlarged cross-sectional view showing the catch and release mechanisms for making the pill box child-proof taken substantially along lines 18—18 in the direction of the arrows as shown in FIGURE 17.
Figure 19:
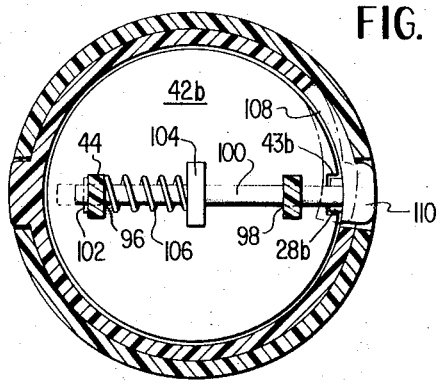
FIGURE 19 is an enlarged cross-sectional view showing the details of the release mechanism taken substantially along lines 19—19 in the direction of the arrows as shown in FIGURE 18.

In an alternative embodiment, as shown in FIGURES 17, 18 and 19, a latch is provided interiorly of the container to prevent opening of the container and to prevent access to the pills by a child. In this embodiment, the container 20b includes the generally vertical boss 28b which is received in a notch 43b, as previously described.

The handle 44 is provided with apertures 96 and 98 through which a bolt or latch 100 extends and is slidably received. A pin 102 limits the movement in one direction and a keeper 104 is fixed intermediate the ends of the bolt 100. A spring 106 biases the keeper 104 and consequently the latch 100 toward the walls of the container such that, in the closed position, the bolt 100 normally engages the bottom of the boss 28b to prevent upward movement of the disc 42b and consequently to prevent upward movement of the disc 66b. Thus, unless the latch 100 is disengaged from the bottom of boss 43b, access cannot be had to the pills either from the top or from the bottom.

In the preferred embodiment, a lip 108, best shown in FIGURE 19, is formed in the wall of the container and has provided on the end a boss 110 which engages the time marker sleeve 56. Since the material of which the container is made is semi-resilient, boss 110 may be depressed thereby moving the finger 108 against the end of latch 100 to disengage the end thereof from the boss 28b to permit opening of the dispenser. Obviously, any convenient type of disengaging mechanism and latch may be used but the type disclosed is exemplary of the invention and forms a preferred embodiment thereof.

It will be apparent from the foregoing description that a highly versatile pill dispenser which may be used to dispense pills of widely varying sizes and configurations simultaneously or individually has been described. The utility and broad applicability of the invention will be apparent to those skilled in the art.

While the invention has been abstracted, summarized and disclosed with reference to a specific embodiment to permit those skilled in the art easily to practice the invention, it will be understood that the disclosure, the abstract, and the summary are not intended in the limiting sense. Accordingly, it is expected that the invention be limited in scope only by the appended claims.

I claim:
1. A recording pill dispenser, comprising:
   a container for pills, said container having a cylindrical side wall portion and a substantially planar top clossure portion having at least one dispensing aperture therethrough;
   a plurality of time indicating upwardly extending projections disposed about the outer periphery of the container;
   a dispensing cap, having a cylindrical side wall portion with an opening therethrough and a substantially planar top closure portion, rotatably and telescopically received over the top portion of the container;
   means resiliently biasing the cap toward the container top portion for maintaining the container in a normally closed condition; and
   at least one downwardly extending projection comprising an extension of the cap side wall portion selectively received between said upwardly extending projections;
   whereby when the cap is rotated relative to the container said cap is caused to be lifted from the container top to permit a pill to be dispensed and when the cap is further rotated said cap again closes the container, one of said upwardly extending projections adjacent said downwardly extending projection being indicative of the last opening of the dispenser.
2. The dispenser of claim 1 wherein:
   the cap has a central aperture therethrough;
   the container top portion has a central aperture therethrough; and the resilient bias means includes
      a pill support disc in the container,
      a shaft secured at its proximate end to the disc extending through the central apertures in the container and the cap,
      a compression spring on the shaft between the disc and the container top, and
      means securing the distal end of the shaft exteriorly of the cap.
3. The dispenser of claim 1 wherein:
   the time indicating upwardly extending projections comprise,
      a removable sleeve received about the container,
      a plurality of said projections extending upwardly from said sleeve; and
      the container further comprises:
         means secured externally of said container for fixing the position of the sleeve on said container.
4. The dispenser of claim 1 further including:
   means on the dispenser for engaging the cap to permit rotary movement in only one direction.
5. The dispenser of claim 4 wherein:
   the means for permitting one-way rotary motion comprises,
      teeth on the cap, and
      a ratchet dog mounted for selective engagement with said teeth.
6. The dispenser of claim 1 wherein:
   the container is in the form of a right cylinder the planar top portion having a central aperture therethrough;
   the cap is cylindrical in shape having a central aperture through the planar top portion;
   and further including:
      an elongate guide boss longitudinally disposed on the interior wall of the container;
      a disc having a notch therein received in said cylindrical container, said notch receiving said guide boss;
      a shaft, secured at its proximate end to the disc, extending through the central apertures in the container top and the cap;
      means securing the distal end of the shaft exteriorly of the cap; and
      a compression spring received on the shaft between the disc and the top of the container, said spring comprising the resilient biasing means.
7. The dispenser of claim 6 further comprising:
   a multiplicity of ratchet teeth on the cap top;
   a ratchet arm secured to the distal end of the shaft, said ratchet arm comprising the means securing the distal end of the shaft exteriorly of the cap; and
   a ratchet dog on the ratchet arm selectively engaging said ratchet teeth for permitting rotary motion of the cap in only one direction.
8. The dispenser of claim 7 further comprising:
   a boss projecting from the exterior surface of the container;
   a sleeve, having a notch for receiving said boss, removably received about the container;
   and wherein:
      the time indicating projections extend upwardly from the removable sleeve, said projections further comprising,
         a plurality of bosses on the distal end of each projection, said bosses having a notch proximate the top thereof.
9. The dispenser of claim 1 further comprising:
   an annular boss on the container;
   a boss on the dispensing cap disposed for engagement with the annular boss for preventing the container from being opened when said bosses are engaged.
10. The dispenser of claim 9 wherein:
    the walls of the container and the annular boss are resilient; and
    an aperture is provided in the dispensing cap to permit the walls and annular boss to be deformed to release the annular boss from engagement with the boss on the dispensing cap.
11. The dispenser of claim 10 wherein the means resiliently biasing the cap toward the container top portion comprises:
    an elongate member selectively secured to the cap extending interiorly of the container;
    a slidable pill support disc secured on the distal end of said elongate member, said disc substantially closing the bottom of the container for preventing access to the pills; and
    means resiliently biasing the disc away from the top portion and the cap toward the top portion for normally maintaining the container in closed condition.
12. The dispenser of claim 11 further comprising:
    an elongate boss disposed generally vertically on an interior wall of the container, said disc having a boss receiving notch therein for relative slidable movement;
    a latch member secured to the disc for selective engagement with the bottom of the boss for normally lock- ing the container closed and preventing access to the pills; and means accessible from the exterior of the container for disengaging said latch from said boss to permit opening of said container.

13. The dispenser of claim 12 wherein:
the container is composed of a resilient material; and the means for disengaging the latch from the boss comprises,
   a lip formed from the container wall, the free end of said lip being disposed to engage the latch for disengaging the latch from the boss.

14. The dispenser of claim 13 wherein:
the latch comprises,
   a laterally movable member, and
   means biasing the member toward the wall for normal engagement with the boss.

References Cited

UNITED STATES PATENTS

| | | | |
|---|---|---|---|
| 1,637,890 | 8/1927 | Baker | 222—519 |
| 1,760,946 | 6/1930 | Hammerstein | 222—519 |
| 1,913,274 | 6/1933 | Hayden | 222—519 X |
| 1,940,719 | 12/1933 | Le Blanc | 222—522 X |
| 2,631,763 | 3/1953 | Sutton | 222—522 X |
| 3,085,679 | 4/1963 | Burrell | 206—42 |

SAMUEL F. COLEMAN, *Primary Examiner.*